United States Patent
Farr

(10) Patent No.: US 6,611,478 B1
(45) Date of Patent: Aug. 26, 2003

(54) APPARATUS FOR RECOVERING DATA AND CLOCK SIGNALS FROM AN OPTICAL RECORDING MEDIUM

(75) Inventor: Mina Farr, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 638 days.

(21) Appl. No.: 09/608,509

(22) Filed: Jun. 30, 2000

(51) Int. Cl.[7] ................................................ G11B 7/00
(52) U.S. Cl. .................................. 369/44.26; 369/44.23
(58) Field of Search ........................... 369/44.11, 44.14, 369/44.23, 44.26, 59.19, 110.02, 110.04, 112.16, 47.28

(56) References Cited

U.S. PATENT DOCUMENTS 5,555,231 A * 9/1996 Yamamoto .................. 369/122
5,561,655 A * 10/1996 Gage et al. ............... 369/44.26
6,101,154 A * 8/2000 Kim ......................... 369/13.24

* cited by examiner

Primary Examiner—Thang V. Tran
Assistant Examiner—Bach Q Vuong

(57) ABSTRACT

Apparatus is disclosed for recovering both a data signal and a clock signal from an optical disk, in which nonconfocal detection is used to recover the data signal and confocal detection is used to recover the clock signal. The clock signal is recorded at a frequency slightly higher than the highest frequency components of the data signal, so the clock signal is not incorporated into the signal recovered by the nonconfocal data detector. The data and clock signals thereby can be recovered simultaneously from the optical disk, using just a single laser beam and objective lens.

10 Claims, 2 Drawing Sheets

APPARATUS FOR RECOVERING DATA AND CLOCK SIGNALS FROM AN OPTICAL RECORDING MEDIUM

BACKGROUND OF THE INVENTION

This invention relates generally to apparatus for recovering data and clock signals from optical disks and, more particularly, to such apparatus that recover data and clock signals simultaneously.

Apparatus of this particular kind is useful in recovering data signals recorded in the form of data pits or marks in a recording layer of an optical disk, wherein the recording layer incorporates a spiral or concentric servo track that is a permanent physical feature of the recording layer and that provides a track-following reference and defines the path along which data is written. In some types of prerecorded optical disks, such as read-only memories (ROM) disks, the data marks themselves function as the servo track. In other types of optical disks, only a servo track is prerecorded, and data marks are recorded on top of that servo track.

Apparatus for recovering recorded data signals from an optical disk of this kind typically incorporates an optical assembly that focuses a laser beam onto the servo track as the disk is rotated. This produces a reflected beam having an intensity that is modulated by the recorded pattern of data marks. The optical assembly directs this reflected beam to a detector, to produce a data signal representative of the recorded data signal. The optical assembly further incorporates a focus positioner for maintaining the incident laser beam properly focused on the servo track, and it further incorporates a tracking positioner for maintaining the beam aligned with the track in a cross-track direction as the disk is rotated.

One prior apparatus of this kind minimizes the degree by which the prerecorded clock signal interferes with recovery of the data signal by using a clock signal having a frequency higher than the highest frequency component of the recorded data signal. The recorded data signal is recovered from the optical disk using a first laser beam, having a wavelength selected such that its focused spot size is too large to effectively detect the recorded clock signal. Generally, the spot size of a focused laser mean is diffraction-limited to a diameter approximately equal to the beam's wavelength. The recorded clock signal is recovered using a second laser beam, having a shorter wavelength and thus a smaller focused spot size. Both laser beams are focused onto the rotating disk using a common objective lens.

Although the apparatus described briefly above is effective in recovering both a data signal and a clock signal from an optical disk, it is considered to be unduly complex. Besides requiring the use of two separate lasers, with associated optics, the apparatus also requires the use of a dichroic beamsplitter for first merging the two incident laser beams together and then separating the two reflected beams from each other.

It should, therefore, be appreciated that there is a need for an improved apparatus for recovering data and clock signals simultaneously from an optical recording medium such as a rotatable disk, while avoiding the need for two separate lasers, yet preventing the recorded clock signal from interfering with the recovery of the data signal. The present invention fulfills this need and provides further related advantages.

SUMMARY OF THE INVENTION

The present invention is embodied in any improved apparatus for recovering data and clock signals simultaneously from an optical recording medium, while avoiding the need for two separate lasers, yet preventing the recorded clock signal, which has a frequency higher than the highest frequency components of the recorded data signal, from interfering with the recovery of the data signal. More particularly, the apparatus incorporates a laser configured to generate an incident beam of light having a predetermined nominal wavelength, and an optical assembly configured to focus the incident beam of light onto the optical recording medium. This produces a reflected beam having an intensity that is modulated according to the recorded data and clock signals. A beam splitter separates the reflected beam into first and second beams. A nonconfocal data detector receives the first beam and produces a recovered data signal that varies according to the recorded data signal, wherein the bandwidth of the nonconfocal data detector is insufficient to detect the amplitude modulation of the recorded clock signal. Finally, a confocal clock detector receives the second beam and produces a recovered clock signal representative of the recorded clock signal.

In more detailed features of the invention, the optical assembly includes a single objective lens configured to focus the incident beam onto optical recording medium and to collect light reflected therefrom, to form the intensity-modulated reflected beam. The reflected beam retraces the path of the incident beam back to a polarizing beam splitter, for separation. The confocal clock detector comprises a pinhole located at a the conjugate plane with respect to the laser and the focused beam of light on the optical recording medium.

The optical recording medium preferably takes the form of a rotatable disk incorporating a recording layer having a servo track that records the data and clock signals. In addition, a focus error detector receives a portion of the reflected beam, for use in positioning the objective lens such that the incident beam is properly focused on the disk's recording layer. Further, a track error detector likewise receives a portion of the reflected beam, for use in positioning the objective lens such that the incident beam properly tracks the servo track formed in the disk's recording layer.

Other features and advantages of the present invention should become apparent from the following description of the preferred embodiment, taken in conjunction with the accompanying drawings, which illustrate, by way of example, the principles of the invention.

DESCRIPTION OF THE PREFERRED EMBODIMENT

Figure 1:
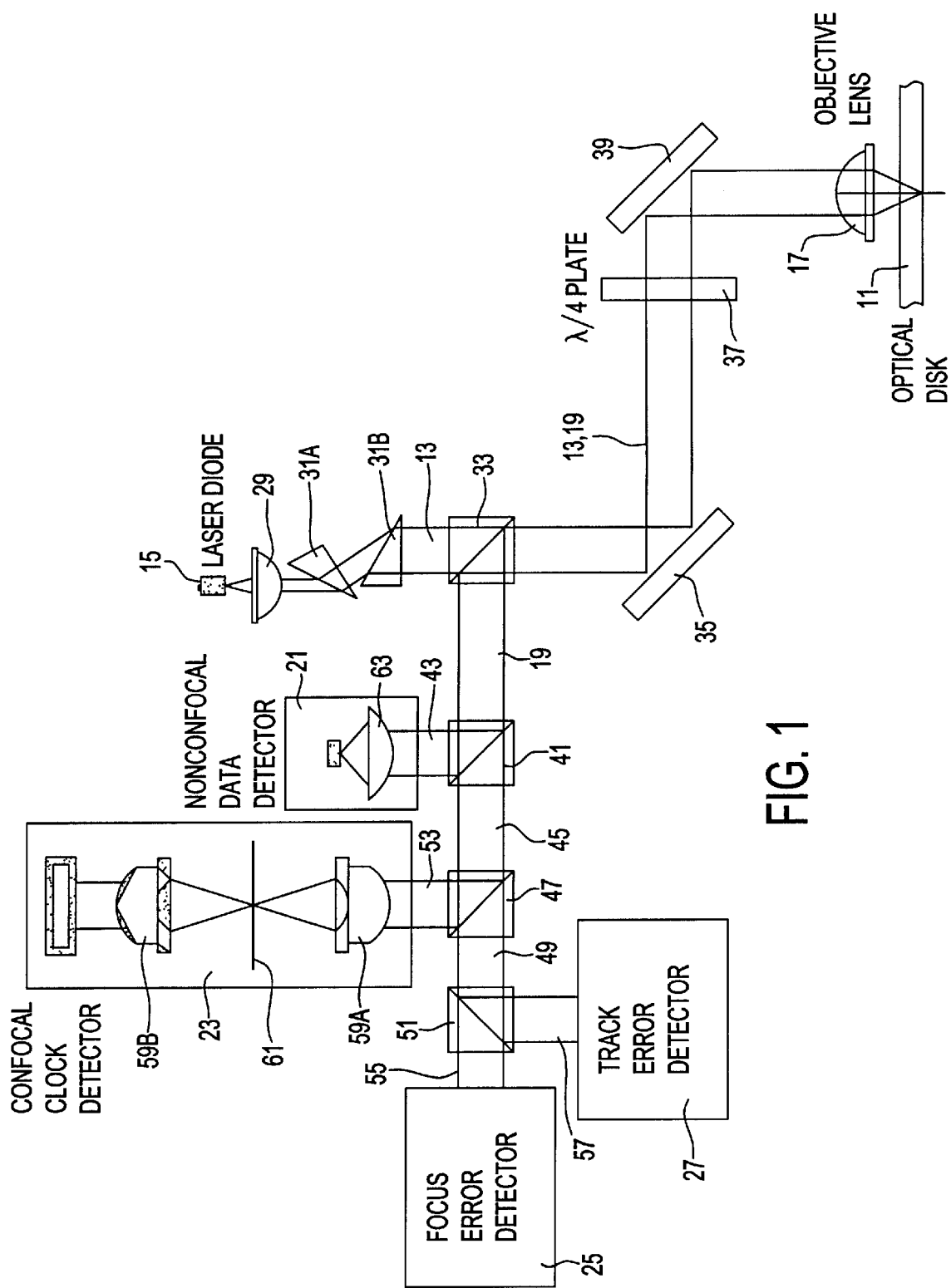
FIG. 1 is a simplified schematic diagram of apparatus in accordance with the invention, for recovering data and clock signals from an optical disk.

With reference now to the illustrative drawings, and particularly to FIG. 1, there is shown a schematic drawing of an apparatus for recovering data and clock signals simultaneously from an optical disk 11, using just a single incident beam of light 13. The data and clock signals are recorded together in a series of data pits or marks forming a spiral or concentric servo track in a recording layer of the disk. The recorded clock signal has a uniform frequency that is higher than the highest frequency components of the recorded data signal.

The incident beam of light 13 is generated by a laser diode 15, and it is focused onto the recording layer of the optical disk 11 by an objective lens 17 as the disk is rotated at a prescribed rate by a motor (not shown). A reflected beam 19 thereby is produced, having an intensity that is modulated according to the recorded data and clock signals. This reflected beam is collected by the objective lens and directed back to both a data detector 21 and a clock detector 23, to detect the respective data and clock signals. The reflected beam also is directed to a focus error detector 25, which is part of a system for controlling the focusing of the incident beam 13 on the disk's recording layer, and to a track error detector 27, which is part of a system for maintaining the focused beam spot aligned with the servo track.

More particularly, the laser diode 15 emits a beam of light that is linearly polarized, and this beam is collimated by a collimator 29 and then expanded using a pair of anamorphic prisms 31a and 31b. The expanded beam, which constitutes the incident beam 13, then is transmitted through a polarizing beam splitter 33 and reflected by a first mirror 35 to a quarter-wave plate 37, for conversion to circular polarization. A second mirror 39 then reflects this circularly polarized beam to the objective lens 17, for focusing onto the recording layer of the optical disk 11.

A portion of the light reflected by the optical disk 11 is collected by the objective lens 17, to form the intensity-modulated reflected beam 19. This intensity-modulated beam is redirected back along the same path as the incident beam 13. Along this path, the quarter-wave plate 37 converts the circularly polarized reflected beam back to linear polarization, having a plane of polarization orthogonal to the plane of the linearly polarized incident beam. This linearly polarized reflected beam thereby is reflected by the polarizing beam splitter 33, to separate the reflected beam from the incident beam.

The intensity-modulated beam 19 reflected by the polarizing beam splitter 33 is separated into four separate beams and directed separately to the data detector 21, the clock detector 23, the focus error detector 25, and the track error detector 27. Specifically, the intensity-modulated beam 19 is initially directed to a first beam splitter 41, which separates the beam into a first beam 43, directed to the data detector 21, and a second beam 45, directed to a second beam splitter 47. The second beam splitter 47, in turn, separates the second beam 45 into a third beam 49, directed to a third beam splitter 51, and a fourth beam 53, directed to the clock detector 23.

The third beam splitter 51, in turn, separates the third beam 49 into two beams 55 and 57. The separated beam 55 is directed to the focus error detector 25, which is part of the control system mentioned above, for controlling the focusing of the incident beam 13 on the recording layer of the optical disk 11. The other separated beam 57 is directed to the track error detector 27, which is part of the control system mentioned above, for maintaining the focused beam spot aligned with the servo track formed in the recording layer. Many alternative arrangements of optical components could be used to provide functions similar to those provided by the components depicted in FIG. 1.

As previously mentioned, the clock signal recorded in the recording layer of the optical disk 11 has a frequency higher than the highest frequency component of the recorded data signal. Also as previously mentioned, the reflected beam 19 that is collected by the objective lens 17 and directed to the data detector 21 and the clock detector 23 has an intensity that is modulated according to both the data signal and the clock signal. The data detector is configured to detect the data signal portion of this intensity modulation, while avoiding interference by the superimposed clock signal. The clock detector, on the other hand, is configured to detect the higher-frequency clock signal. This is achieved by configuring the data detector for conventional, nonconfocal detection and by configuring the clock detector for confocal detection.

A confocal system incorporates an ideal point source and an ideal point detector, both placed at conjugate planes with respect to an object. The ideal point source illuminates the object with its intensity diffraction image via illumination optics, and the object reflects (or transmits) the light to the ideal point detector via detection optics. The effective intensity profiles for the nonconfocal data detector 21, $I_D(r)$, incorporating an ideal point source and a nonpoint detector, and for the confocal clock detector 23, $I_C(r)$, incorporating an ideal point source and an ideal point detector, can be written as follows:

$$I_D(r) = \left(\frac{2 \cdot J_1(\pi \cdot x)}{(\pi \cdot x)}\right)^2$$

$$I_C(r) = \left(\frac{2 \cdot J_1(\pi \cdot x)}{(\pi \cdot x)}\right)^4$$

where: $x = r/(\lambda \cdot F)$ $\lambda$ is the wavelength, r is the radial coordinate, or $\sqrt{(x^2+y^2)}$, F is the f/# of the system, and $J_1$ is the first order Bessel function.

Figure 2:
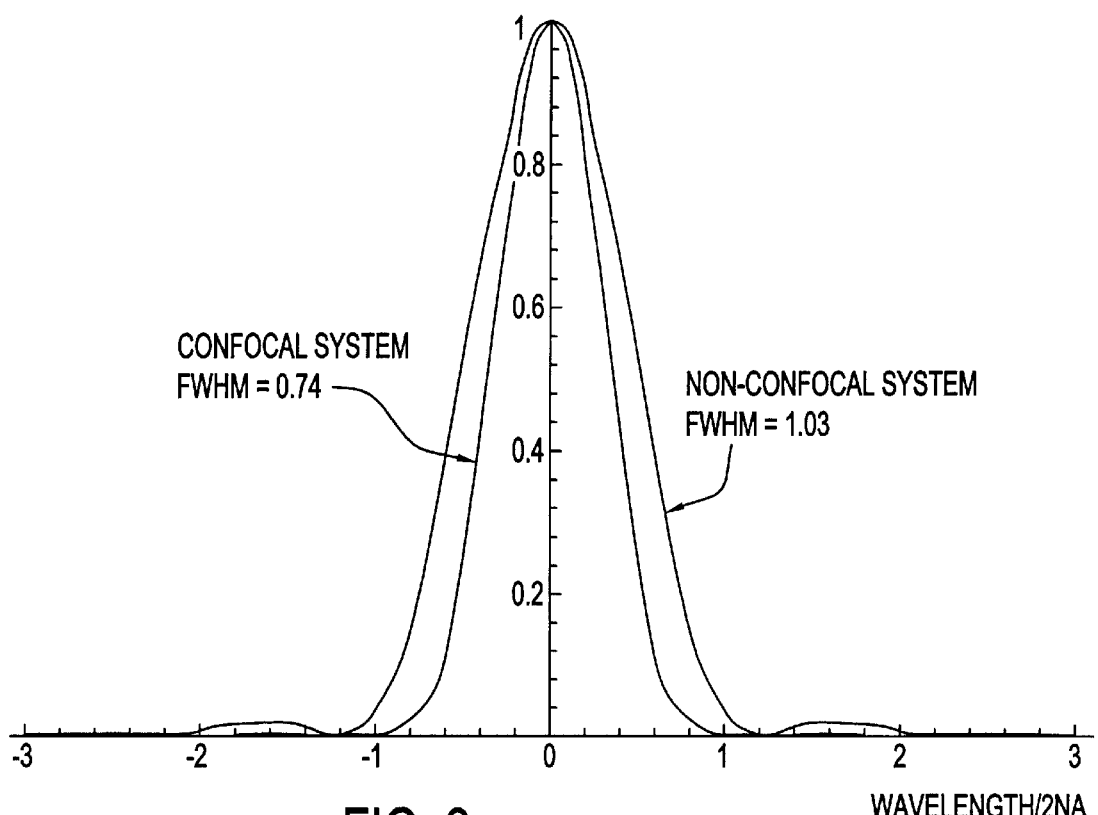
FIG. 2 is a graph depicting the effective intensity profiles of a focused spot in both a confocal system and a nonconfocal system, using a beam of light having the same wavelength and an objective lens having the same numerical aperture.

These intensity profiles are depicted graphically in FIG. 2. It will be noted that the intensity profile for the confocal system is substantially narrower than is that for the nonconfocal system. Specifically, the Full Width Half Maximum (FWHM) of the spot in the confocal system is about 72% that of the spot in the nonconfocal system, for the same numerical aperture and wavelength. It also will be noted that the intensity profile for the confocal system is substantially devoid of a first diffraction ring, whereas the intensity profile for the nonconfocal system has a substantial diffraction ring at 1.635 $\lambda$F.

The narrower intensity profile for the confocal system provides the effect of scanning the recording layer of the optical disk 11 with a spot having a cross-section smaller than that of the nonconfocal system. Effectively, the confocal system detects the object information with a spot whose shape is the product of the intensity diffraction image of a point source and that of a point detector at the object plane.

It is important to note that use of a confocal detection scheme does not reduce the actual spot size on the recording layer of the optical disk 11. Rather, use of a confocal detection scheme reduces the effective spot size that is perceived by the point detector. The reduction in effective spot size can be considered the same as a reduction in the wavelength or light or an increase in the numerical aperture of an otherwise equivalent nonconfocal system. Specifically, using a confocal detection scheme with a wavelength $\lambda$ and a numerical aperture of 0.6 is equivalent to using a nonconfocal detection scheme with a wavelength of 0.72 $\lambda$ or with a numerical aperture of 0.84.

With reference again to FIG. 1, the clock detector 23 achieves confocal detection by incorporating a pair of lenses 59a and 59b and an intermediate pinhole 61, with the pinhole being located at a conjugate plane with respect to the laser diode 15 and the focused spot on the recording layer of the optical disk 11. The data detector 21, on the other hand, incorporates only a lens 63 and not a pinhole.

The resolution of the data detector 21 is established only by the disk focusing optics, which includes the objective lens 17. Thus, if the objective lens has a numerical aperture of 0.6 and if the operating wavelength is 600 nanometers (nm), the detector's resolving capability, expressed in terms of its Modulation Transfer Function (MTF), is as follows:

$$MTF(f) = \frac{2}{\pi}(\phi - \cos\phi\sin\phi)$$

$$\text{where: } \phi = a\cos\left(\frac{\lambda f}{2NA}\right)$$

The data detector's effective cutoff frequency is thus:

$$f_0 = \frac{2NA}{\lambda} = \frac{1}{\lambda F}$$

This corresponds to 2.0 cycles/micron, for a system with a numerical aperture of 0.6 at 600 nm.

On the other hand, the resolution of the clock detector 23 is established by the confocal detection optics, which includes not only the objective lens but also the point detector optics. This effectively increases the effective NA to 0.84, for an objective lens having an NA of 0.6, operating at 600 nm. The cutoff frequency for such a confocal system therefore is extended to 2.78 cycles/micron.

Figure 3:
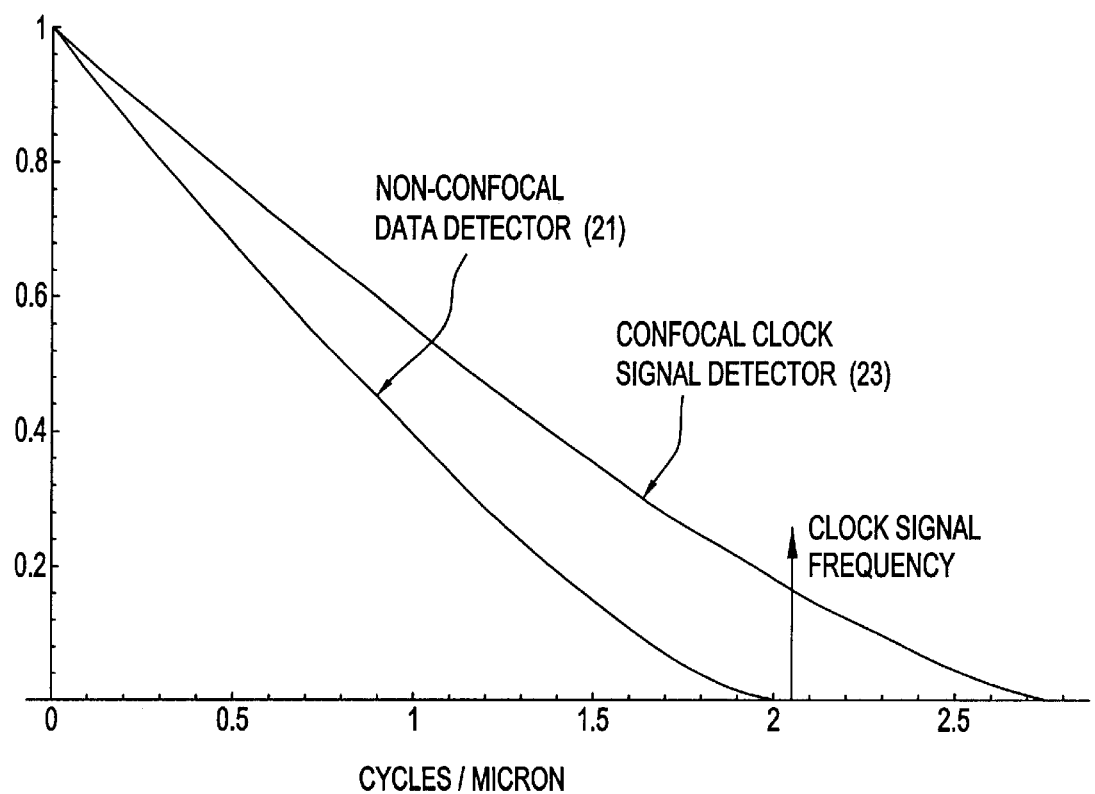
FIG. 3 is a graph depicting the modulation transfer function (MTF) for both the nonconfocal data detector and the confocal clock detector of the apparatus of FIG. 1.

FIG. 3 depicts the MTFs of both the nonconfocal data detector 21 and the confocal clock detector 23. It will be appreciated that by selecting the system's clock frequency to be slightly above 2 cycles/micron, the confocal clock detector will show about 20% modulation in the detected signal, while the nonconfocal data detector will not detect the clock signal at all.

It should be appreciated from the foregoing description that the present invention provides an improved optical disk detection scheme that utilizes nonconfocal detection to recover a data signal and confocal detection to recover a clock signal, which is recorded at a frequency slightly higher than that of the data signal. This enables the data and clock signals to be recovered simultaneously from the optical disk, using just a single laser beam and objective lens.

Although the invention has been described in detail with reference only to the presently preferred embodiment, those skilled in the art will appreciate that various modifications can be made without departing from the invention. Accordingly, the invention is defined only by the following claims.

I claim:

1. Apparatus for recovering recorded data and clock signals simultaneously from an optical recording medium, wherein the recorded clock signal has a frequency higher than the highest frequency components of the recorded data signal, the apparatus comprising:
    a laser configured to generate an incident beam of light having a predetermined wavelength;
    an optical assembly configured to focus the incident beam of light onto the optical recording medium, to produce a reflected beam having an intensity that is modulated according to the recorded data and clock signals;
    a beam splitter configured to separate the reflected beam into first and second beams;
    a nonconfocal data detector configured to receive the first beam and produce a recovered data signal that varies according to the recorded data signal, wherein the bandwidth of the nonconfocal data detector is insufficient to detect the amplitude modulation of the recorded clock signal; and
    a confocal clock detector configured to receive the second beam and produce a recovered clock signal representative of the recorded clock signal.

2. Apparatus as defined in claim 1, wherein:
    the optical assembly comprises a single objective lens, a quarter-wave plate, and a polarizing beam splitter;
    the optical assembly is configured such that the reflected beam retraces the path of the incident beam, from the objective lens, through the quarter-wave plate, to the polarizing beam splitter; and
    the confocal clock detector comprises a pinhole located at a conjugate plane with respect to the laser and with respect to the focused beam of light on the optical recording medium.

3. Apparatus as defined in claim 1, wherein:
    the optical recording medium comprises a rotatable disk incorporating a recording layer having a servo track that records the data and clock signals; and
    the apparatus further comprises a motor for controllably rotating the rotatable disk in a prescribed manner.

4. Apparatus as defined in claim 3, wherein the optical assembly comprises:
    a single objective lens configured to focus the incident beam onto the rotatable disk and to collect light reflected therefrom to form the intensity-modulated reflected beam;
    a focus error detector configured to position the objective lens relative to the rotatable disk such that the incident beam is properly focused on the disk's recording layer; and
    a track error detector configured to position the objective lens relative to the rotatable disk such that the incident beam properly tracks the servo track formed in the disk's recording layer.

5. A method for recovering recorded data and clock signals simultaneously from an optical recording medium, wherein the recorded clock signal has a frequency higher than the highest frequency components of the recorded data signal, the method comprising:
    generating an incident beam of light having a predetermined wavelength;
    focusing the incident beam of light onto the optical recording medium, to produce a reflected beam having an intensity that is modulated according to the recorded data and clock signals;
    separating the reflected beam into first and second beams;
    receiving the first beam using a nonconfocal data detector, to produce a recovered data signal that varies according to the recorded data signal, wherein the bandwidth of the nonconfocal data detector is insufficient to detect the amplitude modulation of the recorded clock signal; and
    receiving the second beam using a confocal clock detector, to produce a recovered clock signal representative of the recorded clock signal.

6. A method as defined in claim 5, wherein:
    focusing uses an optical assembly that includes a single objective lens, a quarter-wave plate, and a polarizing beam splitter, wherein the optical assembly is configured such that the reflected beam retraces the path of the incident beam, from the objective lens, through the quarter-wave plate, to the polarizing beam splitter; and the confocal clock detector used in receiving the second beam includes a pinhole located at a conjugate plane with respect to the source of the incident beam and with respect to the focused beam of light on the optical recording medium.

7. A method as defined in claim 5, wherein:

the optical recording medium comprises a rotatable disk incorporating a recording layer having a servo track that records the data and clock signals; and the method further comprises controllably rotating the rotatable disk in a prescribed manner.

8. A method as defined in claim 7, wherein focusing comprises:

using a single objective lens to focus the incident beam onto the rotatable disk and to collect light reflected therefrom to form the intensity-modulated reflected beam;

positioning the objective lens relative to the rotatable disk such that the incident beam is properly focused on the disk's recording layer; and positioning the objective lens relative to the rotatable disk such that the incident beam properly tracks the servo track formed in the disk's recording layer.

9. Apparatus for recovering recorded data and clock signals simultaneously from a rotatable optical recording disk incorporating a recording layer having a servo track that records the data and clock signals, wherein the recorded clock signal has a frequency higher than the highest frequency components of the recorded data signal, the apparatus comprising:

a laser configured to generate an incident beam of light having a predetermined wavelength;

a motor for controllably rotating the rotatable disk in a prescribed manner;

an optical assembly configured to focus the incident beam of light onto the optical recording disk, as the disk is being rotated by the motor, to produce a reflected beam having an intensity that is modulated according to the recorded data and clock signals, wherein the optical assembly includes a single objective lens, a quarter-wave plate, and a polarizing beam splitter, and wherein the optical assembly is configured such that the reflected beam retraces the path of the incident beam, from the objective lens, through the quarter-wave plate, to the polarizing beam splitter;

a beam splitter configured to separate the reflected beam into first and second beams;

a nonconfocal data detector configured to receive the first beam and produce a recovered data signal that varies according to the recorded data signal, wherein the bandwidth of the nonconfocal data detector is insufficient to detect the amplitude modulation of the recorded clock signal; and a confocal clock detector configured to receive the second beam and produce a recovered clock signal representative of the recorded clock signal, wherein the confocal clock detector includes a pinhole located at a conjugate plane with respect to the laser and with respect to the focused beam of light on the optical recording disk.

10. Apparatus as defined in claim 9, wherein the optical assembly further comprises:

a focus error detector configured to position the objective lens relative to the rotatable disk such that the incident beam is properly focused on the disk's recording layer; and a track error detector configured to position the objective lens relative to the rotatable disk such that the incident beam properly tracks the servo track formed in the disk's recording layer.

* * * * *